No. 726,690. PATENTED APR. 28, 1903.
J. T. JEPSON.
SELF DISCHARGING RAILWAY WAGON.
APPLICATION FILED DEC. 1, 1902.

NO MODEL. 6 SHEETS—SHEET 1.

No. 726,690. PATENTED APR. 28, 1903.
J. T. JEPSON.
SELF DISCHARGING RAILWAY WAGON.
APPLICATION FILED DEC. 1, 1902.
NO MODEL. 6 SHEETS—SHEET 2.

Witnesses—
E. R. Peck
Chas. R. Wright Jr.

Inventor—
J. T. Jepson
per Hubert Peck
atty

No. 726,690. PATENTED APR. 28, 1903.
J. T. JEPSON.
SELF DISCHARGING RAILWAY WAGON.
APPLICATION FILED DEC. 1, 1902.
NO MODEL. 6 SHEETS—SHEET 3.
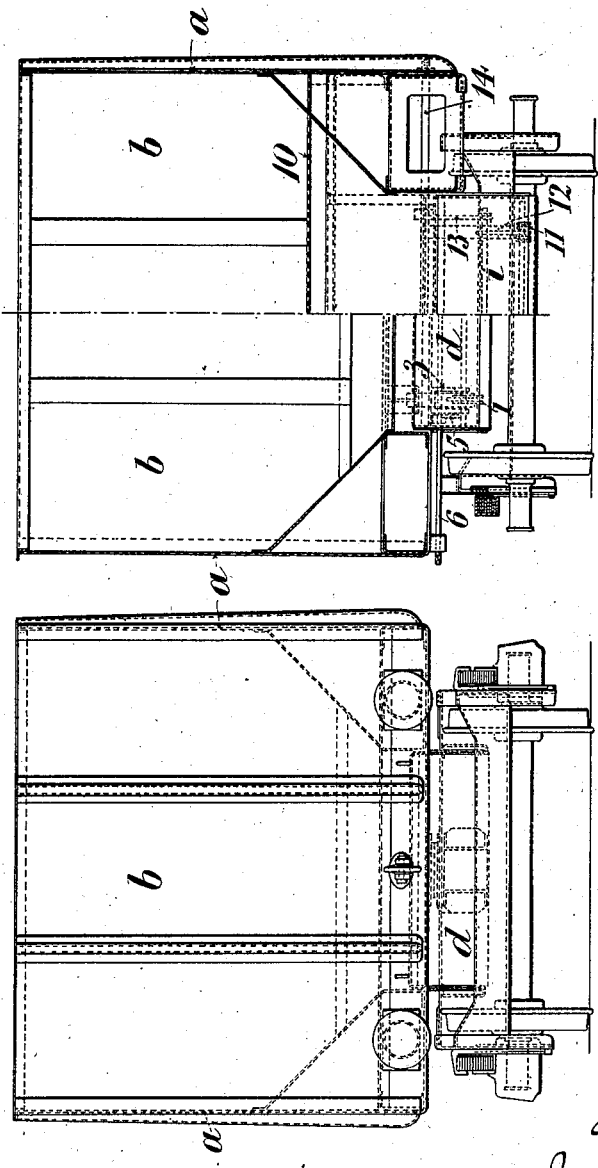
Witnesses—
E. R. Peck
Chas P. Wright Jr.
Inventor—
J. T. Jepson
per
Hubert T. Peck
Atty No. 726,690. PATENTED APR. 28, 1903.
J. T. JEPSON.
SELF DISCHARGING RAILWAY WAGON.
APPLICATION FILED DEC. 1, 1902.

NO MODEL. 6 SHEETS—SHEET 4.

No. 726,690. PATENTED APR. 28, 1903.
J. T. JEPSON.
SELF DISCHARGING RAILWAY WAGON.
APPLICATION FILED DEC. 1, 1902.
NO MODEL. 6 SHEETS—SHEET 5.

Witnesses —
E. R. Peck
Chas. P. Wright Jr.

Inventor —
J. T. Jepson
per Hubert E. Peck
atty

No. 726,690. PATENTED APR. 28, 1903.
J. T. JEPSON.
SELF DISCHARGING RAILWAY WAGON.
APPLICATION FILED DEC. 1, 1902.
NO MODEL. 6 SHEETS—SHEET 6.
Fig. 10. Fig. 11.
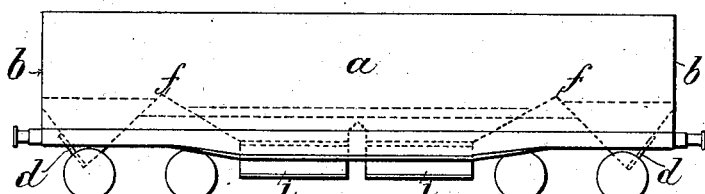 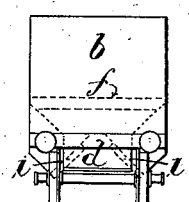
Fig. 12. Fig. 13.
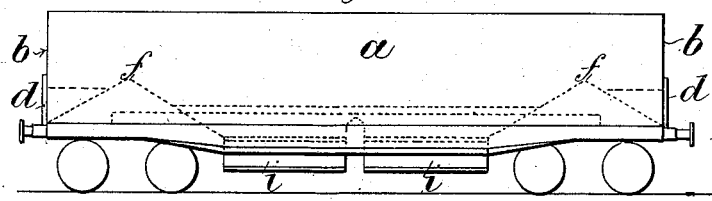 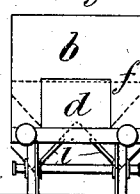
Fig. 14. Fig. 15.
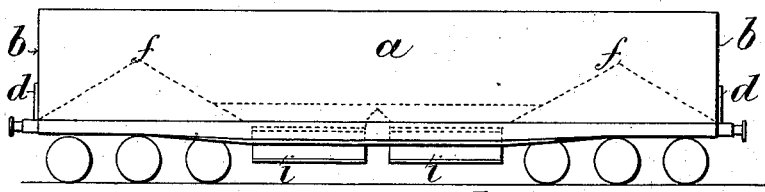 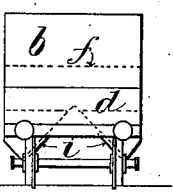
Fig. 16.
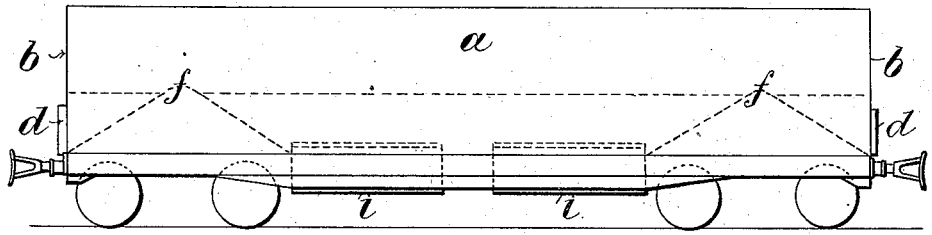
Fig. 17.
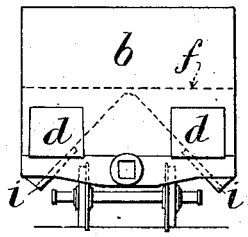
Witnesses—
E. R. Peck
Chas. P. Wright Jr.
Inventor—
J. T. Jepson
per Hubert E. Peck
atty

UNITED STATES PATENT OFFICE.

JAMES THOMAS JEPSON, OF LEEDS, ENGLAND.

SELF-DISCHARGING RAILWAY-WAGON.

SPECIFICATION forming part of Letters Patent No. 726,690, dated April 28, 1903.

Application filed December 1, 1902. Serial No. 133,467. (No model.)

*To all whom it may concern:*

Be it known that I, JAMES THOMAS JEPSON, a subject of the King of Great Britain and Ireland, residing at Headingley, Leeds, in the county of York, England, have invented Improvements in Self-Discharging Railway-Wagons, of which the following is a specification.

The carrying capacity of self-discharging wagons for the conveyance of minerals and other materials in bulk as usually constructed is small in proportion to their over-all dimensions, owing to the arrangements of the discharge-openings being such as to necessitate the wagon-floors, which have to be sloped at such angles that the materials will flow to the doors, intersecting the end walls of the wagon at a considerable height above its bottom. Wagons adapted to carry sixty tons and upward are likely to be required, and with such loads six-wheeled bogies will generally have to be employed. The sloping of the floor of the wagon downwardly from its ends over such bogies toward openings provided near the center of the wagon, as usual in four-wheeled bogie-wagons, would render the capacity of the wagon still smaller in proportion to its over-all dimensions.

Now the object of this invention is to increase the capacity of self-discharging railway-wagons, more particularly those of the bogie type, in proportion to their over-all dimensions. For this purpose I provide doorways between and beyond the adjacent ends of the wheeled supports on which the ends of the wagon rest and so slope the floor of the wagon between the said doorways that the material will be caused to fall partly through the doorways provided between the wheeled supports—that is, at or near the middle of the wagon—and partly through the doorways provided beyond the adjacent ends of the wheeled supports—that is, at or near the ends of the wagon—the sloping portions of the floor meeting between the doorways in summits or ridges which are comparatively low, their height depending on the distance between the doorways. The doorways are closed by doors which may be transversely or longitudinally hinged. The end doorways may be formed in the end walls or in the floor near the ends. The doorways are preferably kept as low down as possible, so that space may be gained below the level of the top of the underframe and transferred to the inside of the wagon to more nearly compensate for that lost above the underframe-level by the inclining of the floors in the various parts of the wagon-body. The net capacity of a self-discharging wagon according to this invention may thus be made almost equal to, and in some cases it may be greater than, the capacity of a flat-bottomed or gondola wagon of equal length, width, and height from rails.

The accompanying drawings illustrate, by way of examples, various constructions of bogie-wagons according to this invention.

Figures 1 to 5 illustrate a twelve-wheeled bogie-wagon constructed according to this invention and so as to discharge the whole of its contents between the rails, Figs. 1 and 2 together showing the wagon, half in side elevation and half in central longitudinal section, Fig. 3 being an end elevation, the right and left hand halves of Fig. 4 being cross-sections on the lines A A and C C, Fig. 1, respectively, and Fig. 5 a quarter plan of the wagon and a quarter plan of its underframe and bogie. Figs. 6 and 7 are respectively diagrammatic side and end elevations of a twelve-wheeled bogie-wagon of similar construction to that illustrated in Figs. 1 to 5, inclusive. Figs. 8 to 17 are similar views to Figs. 6 and 7, illustrating modified constructions of wagons according to this invention.

Similar characters of reference indicate like parts throughout the drawings.

Referring to Figs. 1 to 5, the body of the wagon has vertical side walls *a* and end walls *b*. *c c* are doorways formed near the ends of the wagon and provided with doors *d d*, hinged at their upper edges. The floor *e* of the wagon is inclined downwardly from a transverse summit or ridge *f* above each bogie to a point below the underframe and just above and outside of the outermost axle of the said bogie. The floor *e* is also inclined from the end wall *b* toward the same point, and the doorway *c* is formed through this part of the floor. Each of the doors *d* is held in the closed position by pairs of toggles 1, one of each pair being pivoted to a bracket 3, fixed to the underframe, and the other to the door. The knuckles of the toggles are connected by links 4 to lever-arms 5, fixed on a cross-shaft 6, which extends from side to side of the wagon and is provided at each of its ends with a squared end to receive a lever or crank-handle. By turning the shaft 6 the door can be opened or closed from either side of the wagon, and when closed the door will be locked, the joints of the toggles being then in line. Each draw-bar 8 may extend inside the wagon above the doorway $c$, as shown. With this arrangement the material passing down the inclines and through the doorways $c$ near the ends of the wagon falls between the outer axles and head-stocks of each bogie, where head-stocks are provided, and consequently does not interfere with the free working of the bogie, and where the material has to be discharged between the rails, moreover, the arrangement of end door shown enables the summits or ridges $f$ to be kept low, so that the space lost by hoppering the floor is small and the material in being discharged has only a short distance to fall freely before reaching the rails and does not come in contact with any of the wagon-gear, so that excessive breakage of material and wear and tear of the wagon are obviated. At the longitudinal center or middle of the wagon is a transverse ridge 10, in the lower parts of which are a pair of doorways $g$, closed by a pair of doors $i$, hinged at their upper edges back to back. These doors may be operated in any convenient manner. In the door-operating arrangement illustrated the doors $i$ are coupled by toggles 11, the knuckles of which are connected by links 12 to lever-arms 13, fixed to a transverse shaft 14, extending from side to side of the wagon and provided at each end with a squared end to receive a lever or crank-handle. As will be seen, the end doors are operated independently and the two middle doors simultaneously; but all the doors $d$ and $i$ can be manipulated from either side of the wagon.

In the arrangement illustrated diagrammatically by Figs. 6 and 7 the whole of the contents of the wagon are discharged between the rails, part falling through four transversely-hinged doors $i$, near the middle of the wagon, and part through a door $d$, near each end of the wagon, and arranged as in Figs. 1 to 5. The floor of the wagon slopes from the summits or ridges $f$ to the doors $d$ and $i$, as indicated by dotted lines. The doors $i$ in this case are in pairs separated by an intermediate ridge, as shown.

Figs. 10 and 11 illustrate diagramatically an eight-wheeled bogie-wagon adapted to discharge the whole of its contents between the rails, partly through end doors $d$, arranged as in the previous arrangements, and partly through four longitudinal doors $i$, arranged back to back in pairs near the middle of the wagon and adapted to be operated by any suitable known means.

Figs. 12 and 13 illustrate a similarly-constructed wagon; but in this case doorways closed by doors $d$ are formed in the end walls of the wagon instead of in the floor near the end.

Figs. 14 and 15 illustrate a twelve-wheeled bogie with longitudinal middle doors $i$, and with doors $d$, closing doorways in the end walls and extending the full width of the wagon, which is thus adapted to discharge its contents partly between and partly outside the rails.

Figs. 16 and 17 illustrate an eight-wheeled bogie-wagon with longitudinal middle doors $i$, and with doors $d$, closing doorways in the end walls, all the doorways in this example being disposed near the sides of the wagon instead of near its transverse center, so that the whole of the contents are discharged outside the rails.

Figure 1:
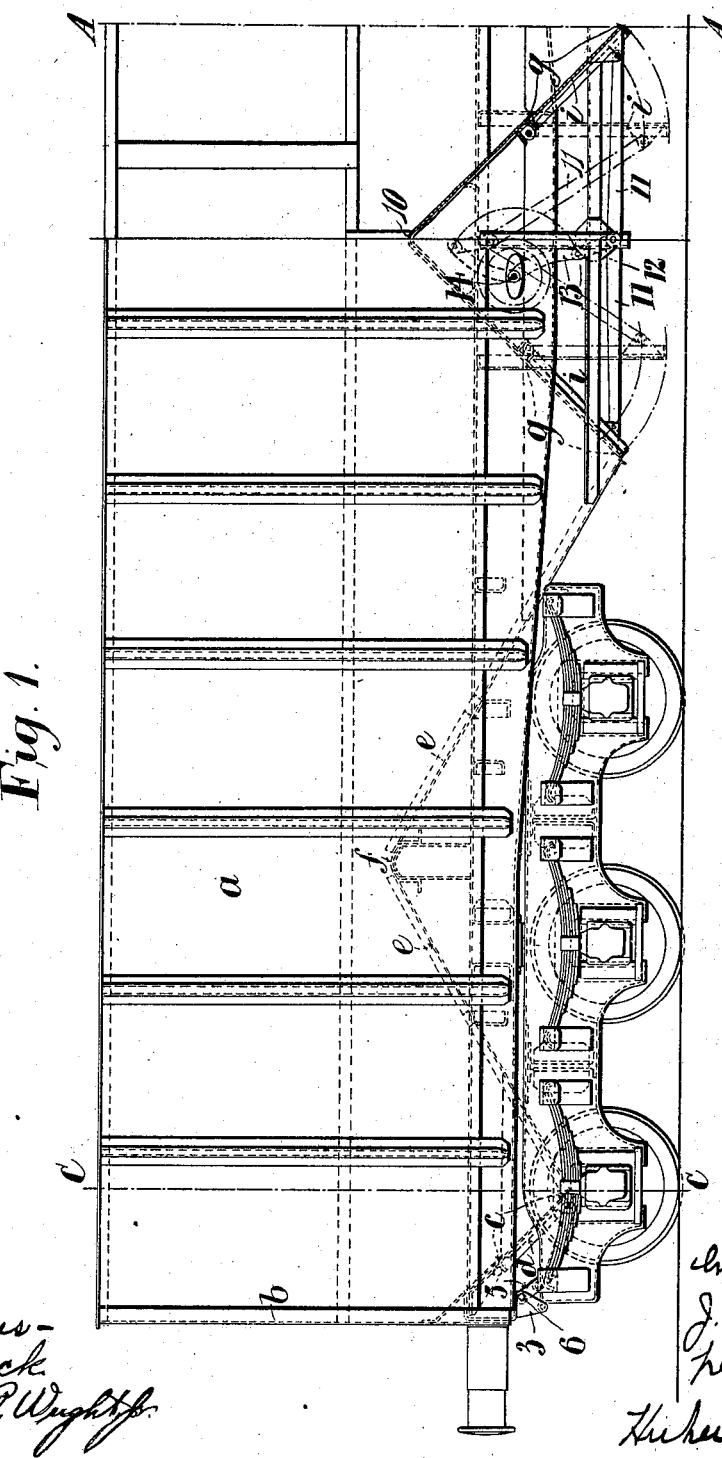
Figure 2:
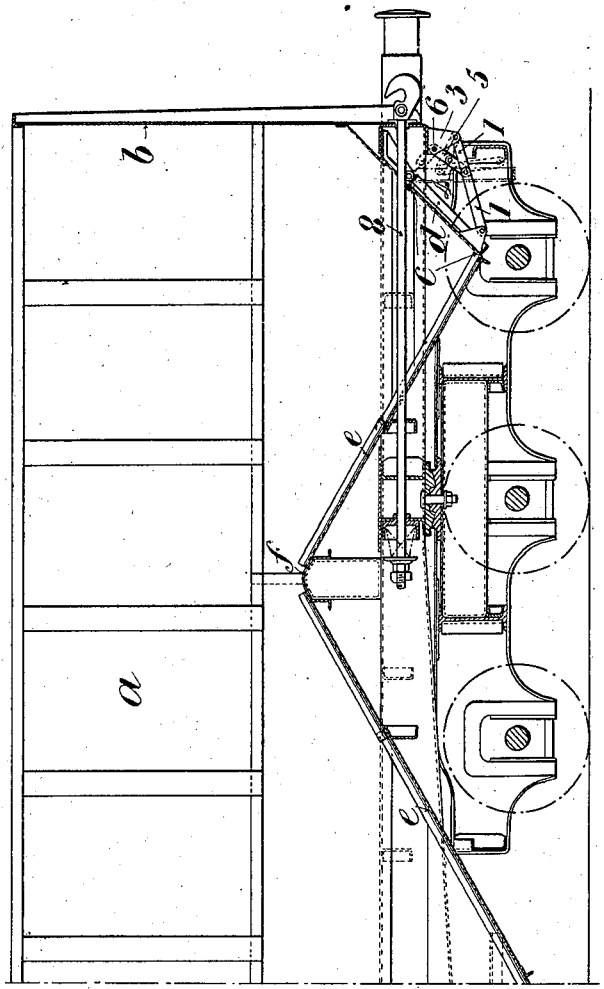
Figure 5:
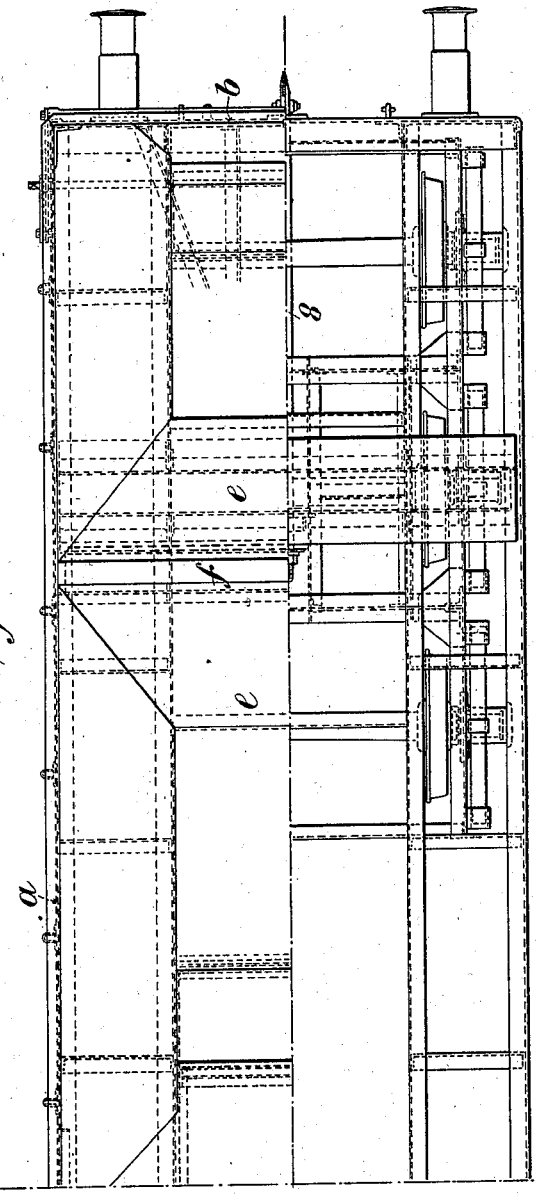
Figure 6:
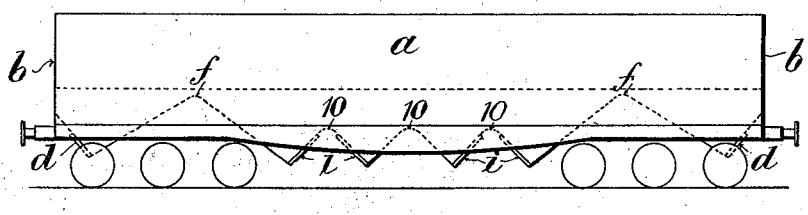
Figure 7:
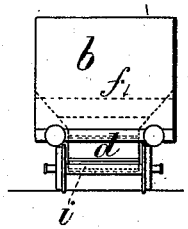
Figure 8:
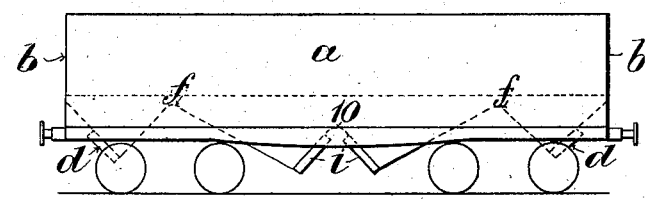
Figs. 8 and 9 illustrate an arrangement of an eight-wheeled bogie-wagon, the whole of the contents of which are discharged between the rails, partly through two hinged doors $i$, near the middle of the wagon, and partly through doors $d$, arranged as in the previous examples.
Figure 9:
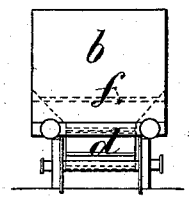

The accompanying drawings illustrate various self-discharging wagons according to this invention by way of examples; but, as will be understood, various modifications may be made. For instance, the doors $d$, at or near the ends of the wagon will generally be hinged transversely, as illustrated; but when they are situated near the ends they may be hinged longitudinally, if desired. The doors $i$ are hinged transversely or longitudinally, chiefly according to the position in which material is to be discharged in relation to the rails upon which the wagon rests. Thus when the whole of the material is to be discharged between the rails the doors $i$ will generally be hinged transversely; but in some such cases it may be preferable to longitudinally hinge the doors $i$, more especially with wagons provided with central buffing and draw gear. When the whole of the material is to be discharged outside the rails, the doors $i$ will be hinged longitudinally, (see Figs. 16 and 17;) but when the material is to be discharged partly outside and partly inside the rails the doors $i$, though generally hinged longitudinally, may be hinged transversely. Instead of four longitudinal doors $i$ a single pair may be used in some cases.

It will be noted that my improved self-discharging wagon comprises a strong underframe designed to support the load and withstand the draw and buffing shocks and that such frame is independent of the body. The interior body construction comprises a series of hoppers having inclined floors and side members, the latter being fixed to the vertical body sides and to the longitudinal sills of the underframe and constituting the sole braces or stays for such vertical sides of the wagon-body. This construction enables me to provide a wagon-body of the requisite strength and rigidity without interior bracings of any kind other than the sides of the hopper above referred to.

The gear for the operation of the doors is self-locking—that is, the toggles when the doors are closed constitute a straight brace from one door to the other, locking the doors against opening, as will be evident. I am thereby enabled to dispense with any locking means for the operating-shaft *per se*, hence permitting the operation of the shaft from either side of the wagon at will without regard to the side from which it was previously operated—a material and important advantage not present to my knowledge in any previous construction, as all such latter provide the operating-shaft with locking means, such as the usual pawl and ratchet, which of course necessitates the operation of the shaft from the end from which it was previously operated and locked by such pawl and ratchet.

What I claim is—

1. A self-discharging wagon comprising a fixed frame mounted upon a wheeled support, a body mounted on the frame and having a hopper-bottom, doorways formed in said bottom, the sides of the hopper-bottom bracing the wagon-body from the fixed frame, doors closing said doorways, mechanism connected with said doors, and a shaft for operating said mechanism, said shaft being free for operation from either end at all times.

2. A self-discharging wagon comprising a fixed frame mounted on a wheeled support, a body mounted on the frame and having a bottom divided into a plurality of hoppers, doors covering openings leading from the hoppers, toggles connecting the doors and having their pivotal connection adapted for vertical movement in a slotted guide, said toggles forming a lock for the doors when the latter are closed, a shaft transverse of the wagon-body and operable from either side thereof, said shaft being free for operation from either end at all times, a lever-arm fixed to the shaft, and a link connecting said lever-arm and the pivotal connection of the toggles, whereby the doors may be opened and closed from either side of the wagon.

3. A self-discharging wagon having a fixed frame mounted upon a bogie, and comprising longitudinal sills, a wagon-body mounted on the frame and having a hopper-bottom, the side frames of the hoppers bracing the wagon-body from the longitudinal sills, discharge-openings covered by doors leading from the hopper-bottom, and means for operating said doors, said discharge-openings being arranged to deliver material through the bogie between the axle and head-stock thereof, substantially as described.

Signed at Leeds, in the county of York, England, this 21st day of November, 1902.

JAMES THOMAS JEPSON.

Witnesses:
WILLIAM JAMES COUSINS,
W. H. McELLROY.